United States Statutory Invention Registration [19]

[11] Reg. Number: H927

Miller [43] Published: Jun. 4, 1991

[54] POST BURN HYDROGEN LIGHT GAS CARTRIDGE

[75] Inventor: Donald Miller, Rockaway, N.J.

[73] Assignee: The United States of America as represented by the Secretary of the Army, Washington, D.C.

[21] Appl. No.: 642,974

[22] Filed: Nov. 23, 1990

[51] Int. Cl.[5] ..... F42B 5/08; F42B 5/067; F42B 5/16

[52] U.S. Cl. ..... 102/440; 102/472; 102/522

*Primary Examiner*—Stephen C. Bentley
*Attorney, Agent, or Firm*—Anthony T. Lane; Edward Goldberg; Edward F. Costigan

[57] ABSTRACT

A post burn hydrogen light gas cartridge utilizes a separation tube to provide a high velocity flow to allow for separation of hydrogen gas from the hydrogen-oxygen combustion product water in a high temperature state produced in a primer initiated combustion chamber containing pressurized hydrogen gas. An accumulator is utilized to provide a large volume of hydrogen gas at high pressure and temperature to feed the expansion of the hydrogen. A second oxidant ampoule reacting with the expanded hydrogen provides a secondary propulsion means giving a velocity additive to the velocity resulting from a primary expansion means.

11 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

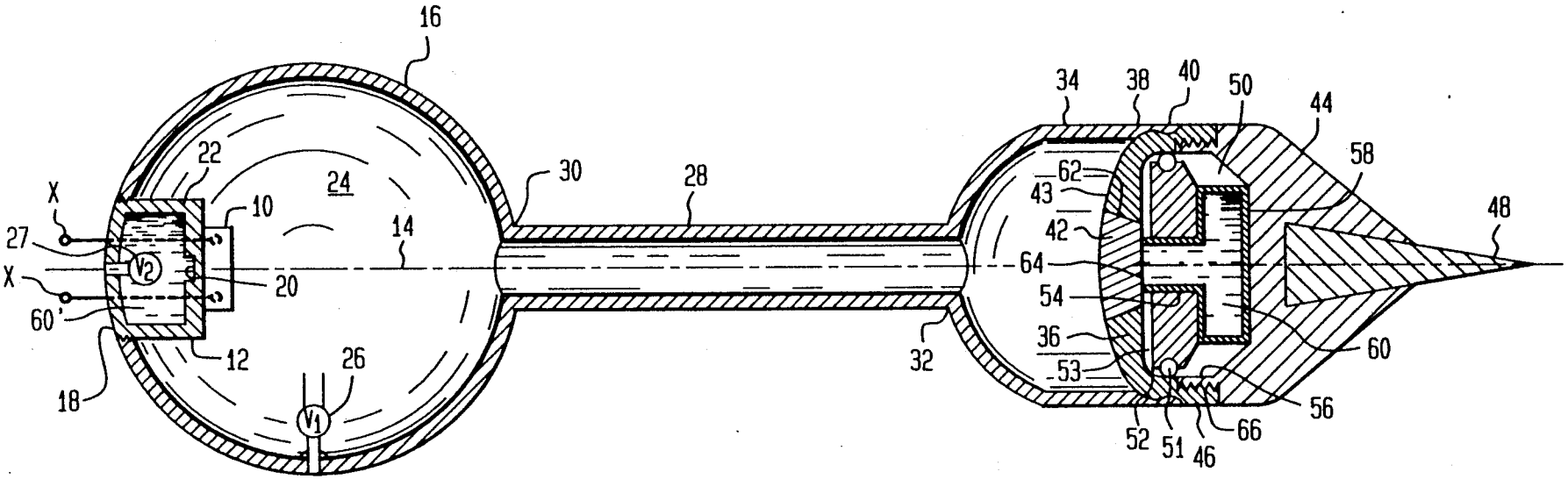
48
58
60
44
56
50
66
40
46
51
38
52
34
62
43
42
64
54
36
53
32
28
30
16
14
24
26
V1
20
10
12
22
V2
18
X
27
X
60'

POST BURN HYDROGEN LIGHT GAS CARTRIDGE

GOVERNMENTAL INTEREST

The invention described herein may be manufactured, used and licensed by or for the Government for Governmental purposes without the payment to me of any royalty thereon.

BACKGROUND OF THE INVENTION

In the past, in order to obtain high projectile velocities in the range of three (3) to ten (10) kilometers/-second prior art devices have had to use two stage light gas guns. These gas guns had to rely on heavy pistons being propelled by a propellant charge, often using a conventional solid propellant, into a pump tube containing light gas. The light gas was compressed to extremely high pressures and high energy levels which, in turn, expanded against a projectile in the launch tube. The problem with this prior art device was requirement of an extremely long and heavy pump tube, up to 20 meters in length, and high accelerations to 250,000 G's.

Prior art single stage light gas guns with velocities in the 2–3 km/sec. range obtain these velocities by igniting a mixture of hydrogen and oxygen in a hydrogen rich mixture. The resulting gas is much heavier than hydrogen because of the large amounts of water in the mixture. This results in much lower projectile velocities than would be obtainable from a pure hydrogen light gas gun. The prior art single stage gas guns were not able to obtain the high projectile energy which resulted from the high compression of the two stage guns.

Alternate configurations of the two stage gas gun which produced shorter and lighter weight guns fail in obtaining the necessary velocity because they cannot bring the light gas to high enough pressure and energy levels.

None of the prior art two stage guns use expanded hydrogen as an energy source for a traveling charge, and none of the prior art single stage gas guns use pure hydrogen.

SUMMARY OF THE INVENTION

The present invention relates to a post burn hydrogen gas cartridge for obtaining projectile velocities which exceed 3 km/sec.

An object of the present invention is to provide for a post burn light gas cartridge which enables projectiles to obtain hypervelocities greater than 1.7 km/sec, when fired from a single stage gas gun.

Another object of the present invention is to provide for a post burn light gas cartridge which does not require the use of a long and heavy two stage gun to obtain the necessary energy and pressure levels to fire a hypervelocity projectile and to generate accelerations closer to those of conventional guns, about 50,000 G's.

A further object of the present invention is to provide for a post burn light gas cartridge wherein the velocity of the expanding gas is directly related to its sonic velocity, and the lighter or lower molecular weight gas has the higher sonic velocity and thus the higher gas velocity on expansion.

For a better understanding of the present invention, together with other and further objects thereof, reference is made to the following descriptions taken in connection with the accompanying drawings.

BRIEF DESCRIPTION OF THE DRAWINGS

FIG. 1 is a diametral longitudinal cross sectional view of the light gas cartridge.

DETAILED DESCRIPTION OF THE PREFERRED EMBODIMENTS

Referring now to FIG. 1, an electrical primer 10 is fixedly attached to the upper surface of an aft oxidant ampoule 12. Liquid oxygen ampoule 12 is hermetically sealed and threadedly fixed along longitudinal axis 14 to a spherically shaped combustion chamber 16 at combustion chamber rear threaded rear end 18. Liquid oxygen ampoule 12 has a thin breakable membrane 20 positioned in juxtaposition with the electrical primer 10. The thickness of the ampoule walls 22 are designed to control the amount of heat transmission therethrough as well as the strength thereof. The combustion chamber 16 contains hydrogen gas 24 therein which is filled to a pressure of approximately 500 p.s.i. through a valve 26. The aft liquid oxygen ampoule 12 is filled by means of a valve 27. A separation tube 28 is pneumatically connected on its rear end 30 to combustion chamber 16 axially along the longitudinal axis 14 and opposite from combustion chamber rear end 18. The forward end 32 of the separation tube 28 has an expanded accumulator tubular section 34 in axial alignment with the separation tube 28. A convex shaped driver member 36 is fixedly and hermetically sealed to the accumulator front end 38 by means of a circumferential crimp 40. A polymeric burn-out plug 42 is axially disposed in the convex front wall 43 of driver member 36. A polymeric segmented housing-sabot 44 is hermetically and threadedly attached to the driver 36 at its rear end 46. A projectile 48 is fixedly held by housing-sabot 44 axially along longitudinal axis 14. Housing-sabot 44 and driver member 36 rear ends form a cylindrical counter bore space 50 which has located therein a piston 52. Piston 52 has a central orifice 54 therein and a piston ring 51 which is hermetically sealed and makes sliding contact with counter bore wall 56. A fore oxidant ampoule 58 is operatively disposed in a portion of counter bore space 50 and intermediate piston 52 and the housing-sabot 44.

In fabrication the forward assembly consisting of the driver 36, piston 52, forward ampoule 58, housing-sabot 44 and projectile 48 is preassembled and hermetically sealed. Liquid oxygen 60 is filled into the fore oxidant ampoule 58 through the burn-out plug hole 62. The burn-plug 42 is then hermetically sealed to the driver 36. Liquid oxygen 60' is then loaded via valve V2 into the aft oxidant ampoule 12. The latter is then threadedly, hermetically sealed into the combustion chamber 16. The forward driver-housing assembly is then crimped onto the accumulator 34. Hydrogen gas is then loaded into the spherical container 16 just prior to loading and firing of the cartridge of FIG. 1. An alternate oxidant in an ambient temperature system would use hydrogen peroxide. The hydrogen peroxide would then be loaded in an assembly plant or in a depot and then held for subsequent usage.

In operation, after the cartridge shown in FIG. 1 is placed into launch tube, not shown, ignition begins when a voltage is applied to terminals x-x of the electrical primer 10 which is attached to the base of the aft oxidant ampoule 12. Activation of the primer 10 causes membrane 20 to break and dispenses liquid oxygen into the ignited hydrogen in the combustion chamber 16 through the nozzle orifice created by the removal of the breakable membrane 20 of the aft oxidant ampoule. As the combustion chamber 16 increases in temperature so does the liquid oxygen 60' of ampoule 12 and therefore dispenses under a correspondingly higher pressure. The thickness of the wall of ampoule 12 provides a means for controlling the burning rate.

This burning rate means is additionally dependent on the ampoule nozzle diameter, chamber 16 temperature, the ampoule heat transfer coefficient and the resulting pressure in the oxidant cartridge 12. The mixture of the oxygen and the hydrogen in the chamber 16 combusts and builds up a pressure therein, which in turn pressurizes the hydrogen in the separation tube 28 and ultimately in the accumulator 34. Mixtures of hydrogen and water vapor exiting the combustion chamber 16 into the separation tube 28 separate into hydrogen rich flows entering the accumulator 34 as a result of the higher flow velocity and resulting separation of the hydrogen gas from the gas mixture flowing through the separation tube 28.

Gas heating in the accumulator 34 comes from the heat of reaction in the combustion chamber 16, shock waves from the separation tube 28, and the high rate of compression of the ignited gas in the accumulator 34. On pressure build up in the accumulator 34 the crimp 40 on the accumulator front end 38 fails and the forward assembly consisting of the driver 36, piston 52, forward ampoule 58, housing-sabot 44 and the projectile 48 is propelled forward. At peak acceleration the burn-out plug 42 fails and the hydrogen is allowed to flow into the driver-piston space 53. When hydrogen gas is allowed into the burn-out plug hole and into space 53, the hydrogen in the space 53 applies pressure to the piston 52 compressing the fore ampoule and collapsing the fore ampoule into space 50. Liquid oxygen jets into the expanded hydrogen aft of the driver 36. The hydrogen temperature is well above the hydrogen-oxygen combustion temperature and combustion commences.

During burning, additional thrust is applied to the forward assembly. Pressure in the fore oxidant ampoule 58 being greater than the gas pressure in the gun barrel or in the space 53 allows for a jet of oxygen through the plug hole 64 into the expanding hydrogen in the gun barrel.

After the piston 52 passes the threaded joint 66 of the housing rear end 46, the housing-sabot 44 thermally degrades and the thread 66 is destroyed. This sequence occurs near the muzzle of the gun tube so that when the projectile 48 leaves the muzzle the three part segmented housing-sabot 44 separates and frees the projectile for flight.

While a specific embodiment of the invention has been shown and described in detail to illustrate the application of the principles of the invention, it will be understood that the invention may be embodied otherwise without departing from such principles.

What is claimed is:

1. A post-burn light gas cartridge which comprises:

spherically shaped combustion chamber means for holding hydrogen gas therein;

aft oxidant ampoule means threadedly attached to said chamber means for storing liquid oxidant therein;

primer means operatively disposed in juxtaposition with said aft ampoule for initiating the firing sequence of said cartridge;

separation means operatively connected to said combustion chamber means for separating mixtures of hydrogen and super heated steam;

accumulator means integrally attached to said separation means for providing space for compression of said hydrogen gas resulting from the heat of reaction in said combustion chamber means and from shock waves generated in said separation means, and as a source of hydrogen gas at uniform temperature and pressure for expansion;

driver means crimpedly attached to said accumulator means for controlling the rate of pressure build up in said accumulator means;

housing-sabot means threadedly attached to said driver means for releasably holding a projectile therein and for providing a hermetically sealed space between said driver means and said housing-sabot means;

piston means slidably disposed in said hermetically sealed space for providing movement in response to pressures generated in said accumulator means; and a fore oxidant ampoule means operatively disposed in said hermetically sealed space proximate to said piston means for providing oxygen to said hydrogen gas to effect its burning, providing additional energy to be released thereby imparting higher velocity to said sabot means.

2. A post-burn light gas cartridge as recited in claim 1 wherein the combustion chamber means includes first valve means for loading hydrogen gas in said chamber means under pressure.

3. A cartridge as recited in claim 2 wherein said aft oxidant ampoule means includes:

second valve means for loading liquid oxygen in said aft ampoule means; and a breakable membrane operatively disposed adjacent to said primer means and breaking upon initiation of said primer means.

4. A cartridge as recited in claim 3 wherein said primer means includes electrical connection operatively attached thereto for providing means for applying a voltage to initiate said primer means.

5. A cartridge as recited in claim 4 wherein said separation means includes a tubular member having its rear end hermetically sealed to said chamber means and its front end hermetically sealed to said accumulator means.

6. A cartridge as recited in claim 5 wherein said accumulator means includes a front end releasably crimped to said driver means.

7. A cartridge as recited in claim 6 wherein said driver means includes:

a convex front wall;

a centrally disposed polymeric burn-out plug disposed in said front wall and in axial alignment with said separation tube and said piston means; and a threaded rear end hermetically attached to said housing-sabot means.

8. A cartridge as recited in claim 7 wherein said housing-sabot means includes:

an externally threaded and counter bored rear end in axial alignment with said piston means; and a polymeric segmented front end.

9. A cartridge as recited in claim 8 wherein said fore oxidant ampoule means includes liquid oxygen.

10. A cartridge as recited in claim 8 wherein said fore ampoule means includes hydrogen peroxide.

11. A cartridge as recited in claim 1 wherein said aft oxidant ampoule means includes hydrogen peroxide.

* * * * *